Patented May 7, 1940

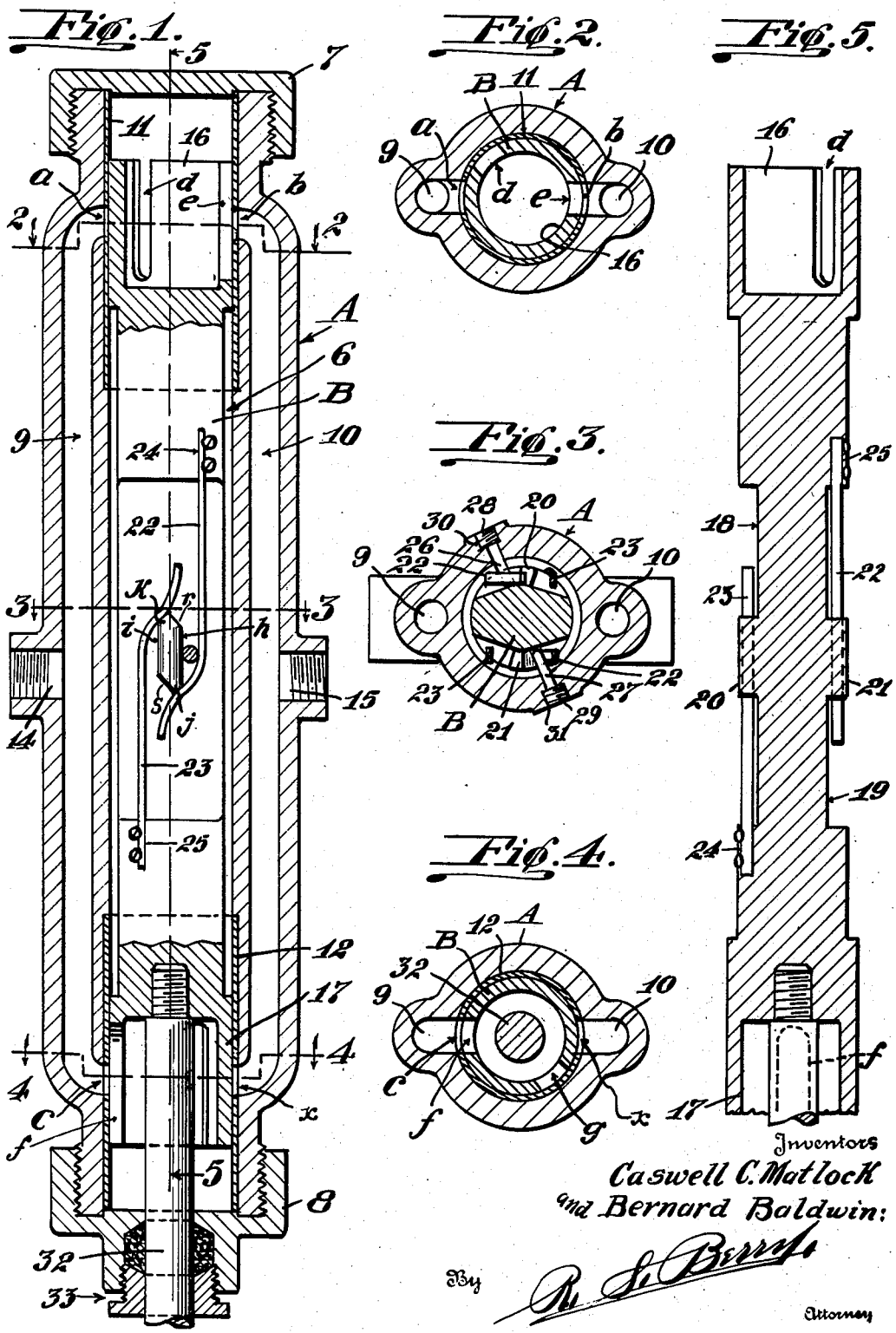

2,199,644

UNITED STATES PATENT OFFICE 2,199,644

FLUID PRESSURE OPERATED ENGINE

Caswell C. Matlock and Bernard Baldwin, Los Angeles, Calif.

Application October 22, 1937, Serial No. 170,413

4 Claims. (Cl. 121—101)

This invention relates to fluid pressure operated engines, and has as its primary object the provision of a mechanism whereby the flow of a liquid under pressure may be converted into mechanical power in the form of reciprocal motion directly through the medium of an automatic valve control.

Another object is to provide a valve controlled means for converting the flow of a liquid into reciprocal mechanical movement, such as is employed in operating reciprocal pumps, stamps, drills, punches, cross-heads, and the like, and which involves few parts of simple construction adapted to be readily assembled and efficiently operated.

With the foregoing objects in view together with such other objects and advantages as may subsequently appear, the invention is carried into effect as illustrated by way of example in the accompanying drawing, in which:

Fig. 1 is a view of the engine as seen in longitudinal section with parts shown in elevation;

Fig. 2 is a view in cross section as seen on the line 2—2 of Fig. 1 in the direction indicated by the arrows;

Fig. 3 is a view in horizontal section as seen on the line 3—3 of Fig. 1;

Fig. 4 is a detail in cross section taken on the ine 4—4 of Fig. 1;

Fig. 5 is a view in vertical section with parts in elevation taken on the line 5—5 of Fig. 1 of a combined valve and piston, showing it apart from its casing or housing.

Referring to the drawing more specifically, A indicates generally a tubular housing having a cylindrical bore 6 in which is arranged a piston B mounted for reciprocal movement and also oscillatory or turning movement around its axis. The housing A is closed at its opposite ends by caps 7 and 8 which are here shown as affixed to the ends of the housing by screw threads, and formed in the housing is a pair of longitudinally extending passages 9 and 10 disposed on diametrically opposed portions of the housing. The ends of the passages 9 and 10 open to the interior of the housing adjacent the ends thereof through bushings 11 and 12 arranged in the end portions of the housing, and in which bushings the end portions of the piston B are carried. The ends of the passages 9 and 10 adjacent the cap 7 open to the interior of the housing through diametrically opposed ports $a$ and $b$ in the bushing 11, and the opposite ends of the passages 9 and 10 open to the interior of the housing through diametrically opposed ports $c$ and $x$ in the bushing 12.

In the arrangement here shown the passage 9 constitutes a liquid or fluid intake passage while the passage 10 constitutes a discharge passage; the housing A being formed with inlets and outlet openings 14 and 15 communicating respectively with the passages 9 and 10 and which openings are here shown as connecting with the passages intermediate the ends thereof and as being internally threaded for connection with feed and discharge pipes not necessary to be here shown.

The piston B is formed at its ends with open ended tubular cylinders 16 and 17 constituting valves; the cylinder valve 16 being formed with elongated slots $d$ and $e$ arranged in angular relation to each other for alternate opening and closing of the ports $a$ and $b$, while the valve cylinder 17 is provided with elongated slots $f$ and $g$ arranged to alternately open and close the ports $c$ and $x$. The slots $d$ and $f$ in the valves 16 and 17 are disposed in offset relation to each other so that when one of the slots $d$ or $f$ is in register with its companion port $a$ or $c$ one of the ports $a$ or $c$ will be open while the other will be closed.

In like fashion the slots $e$ and $g$ are offset relative to each other so that when the slot $e$ is open to the port $b$ the slot $g$ is offset from the port $x$ to close the latter. This alternate opening and closing of the ports is effected by oscillating of the piston around its axis which is automatically effected as will be presently described.

The piston B is formed intermediate its ends with opposed recessed side faces 18 and 19, and projecting from such faces intermediate the ends of the pistons are longitudinally extending elongated lugs 20 and 21 having parallel side walls $h$ and $i$ and V-shaped ends $j$ and $k$.

Extending longitudinally of and carried on the piston B on each side thereof is a pair of oppositely extending plate springs 22 and 23 having their opposite ends affixed in slots 24 and 25 and which plate springs lead on opposite sides of the lugs 20 and 21 in spaced relation to them and have their outer ends inclined with (as viewed in Fig. 1) the end portion of the spring 22 seating on one inclined face of the end $j$ of the lug and with the end portion of the spring 23 seating on one inclined face of the end $k$ of the lug.

Extending through the side walls of the housing A is a pair of diametrically aligned pins 26 and 27 which are here shown as formed on screws 28 and 29 threaded into recesses 30 and 31 in the outer periphery of the housing A. The inner ends of the pins 26 and 27 extend alongside the lugs 20 and 21; being interposed between the lugs and either of the springs 22 and 23 according to which side of the lug is presented to the pin during longitudinal and turning movement of the piston as will be presently described. Each of said lugs also has inclined portions $r$ and $s$ which are acted upon by the pin at its side of the casing to increase the extent of the turning movements imparted to the piston.

Carried on one end of the piston is a stem 32 which extends through a packing gland 33 on the cap 8 and leads to any suitable tool or device designed to be reciprocated on longitudinal movement of the piston; the stem translating movement of the piston to the exterior of the housing.

As here shown in the drawing the piston is disposed in an intermediate position with the port $c$ of the intake passage 9 registering with the slot $f$ of the valve 17, with the port $a$ of the passage 9 closed, with the slot $e$ of the valve 16 registering with the port $b$ of the exhaust passage 10, and with the port $x$ of the latter closed. With the parts thus positioned the piston B is capable of movement on its up stroke under the urge of fluid pressure delivered therebeneath through the intake passage 9 and when thus disposed in an intermediate position on its up stroke the pins 26 and 27 will abut against the lugs 20 and 21 intermediate the ends thereof under the urge of the spring 22 as particularly shown in Fig. 1.

In the operation of the invention, assuming the parts to be positioned as just described, the pressure of liquid directed against the lower end of the piston B causes the latter to move upwardly thereby advancing the lugs 20 and 21 on the piston relative to the pins 26 and 27 on the housing A until the piston assumes a position where the inclined lower end portions of the springs 22 will be flexed outwardly by the action of the pins thus placing the springs 22 under tension and thereby creating a force tending to turn the piston counterclockwise. When the lower ends of the lugs 20 and 21 move to a position alongside the upper portions of the pins 26 and 27 this turning movement of the piston B will occur with the inclined ends $j$ and K of the lugs 20 and 21 riding over the pins to position the oppositely inclined faces S on the lower ends of the lugs opposite the upper portions of the pins. The piston B will thus turn on its axis a partial revolution counterclockwise such as to bring the slot $d$ of the valve 16 from the position shown in Fig. 2 into register with port $a$ of the intake passage and simultaneously rotate the slot $e$ out of registry with the port $b$. The turning movement of the piston B above described also causes the valve 17 to close the port $c$ and open the port $x$, thus directing the liquid under pressure into the valve 16 above the upper end of the piston so as to force the latter downwardly.

On downstroke of the piston the pins 26 and 27 are positioned on the opposite sides of the lugs 20 and 21 to that shown in Fig. 1 and engage the springs 23 to force the latter outwardly as their inclined portions ride over the pins such that the springs 23 will act when the pins clear the upper ends of the lugs to effect reverse turning movement of the valve to again open the port $c$ through the valve 17 when the piston is in its uppermost position. The incoming liquid will then act to again move the piston on its downstroke thus completing a cycle of operation.

During movement of the piston on its upstroke liquid entrapped above the valve 16 will be ejected to the discharge passage 10 by reason of the slot $e$ and port $b$ being in register as shown in Fig. 2 and likewise on downstroke of the piston liquid entrapped in the valve 17 will be delivered to discharge through the then registering slot $g$ and port $x$.

It will be seen referring to the drawing that any desired length of piston stroke may be obtained by varying the length of the lugs 20 and 21 and the positions of the curved spring portions which cooperate with them, since such lugs and spring portions serve to determine the length of stroke of the piston.

While a specific embodiment of the invention has been herein set forth we do not limit ourselves to the exact details of construction and arrangement shown but may employ such changes and modifications in the parts and their arrangement as occasion may require coming within the meaning and scope of the appended claims.

We claim:

1. In a liquid pressure operated engine, a tubular housing, a piston mounted in said housing for longitudinal and axial reciprocating movement, means on said piston for alternately directing liquid under pressure to opposite ends of the piston on axial movement of the latter to effect longitudinal reciprocation of the piston, means for translating movement of the piston to the exterior of the housing, a pin projecting interiorly of the housing, springs carried by said piston engaging said pin for effecting turning of the piston at the ends of the stroke thereof and serving to determine the length of stroke of the piston, and lugs carried by said piston, said lugs having inclined portions which cooperate with said springs to increase the extent of the turning movements which the latter impart to said piston.

2. In a liquid pressure operated engine, a tubular housing, a piston mounted in said housing for longitudinal and axial reciprocating movement, means on said piston for alternately directing liquid under pressure to opposite ends of the piston on axial movement of the latter to effect longitudinal reciprocation of the piston, means for translating movement of the piston to the exterior of the housing, a pin projecting interiorly of the housing, a pair of oppositely spaced plate springs carried on said piston extending on opposite sides of said pin, and a lug on said piston arranged to project between said pin and one of said springs and bearing against said pin under the urge of the other of said springs.

3. In a liquid pressure operated engine, a tubular housing, a piston mounted in said housing for longitudinal and axial reciprocating movement, means on said piston for alternately directing liquid under pressure to opposite ends of the piston on axial movement of the latter to effect longitudinal reciprocation of the piston, means for translating movement of the piston to the exterior of the housing, an elongated lug on said piston extending longitudinally thereof, a pair of oppositely extending plate springs arranged on opposite sides of said lug, and a pin carried on said housing arranged to project between said lug and either of said springs.

4. In a liquid pressure operated engine, a tubular housing, a piston mounted in said housing for longitudinal and axial reciprocating movement, means on said piston for alternately directing liquid under pressure to opposite ends of the piston on axial movement of the latter to effect longitudinal reciprocation of the piston, means for translating movement of the piston to the exterior of the housing, an elongated lug on said piston extending longitudinally thereof, a pair of elongated oppositely extending leaf springs having their opposite end portions secured to said piston in an eccentric substantially parallel relation to its axis, said springs having free adjacent end portions in an overlapping relation to each other and located on opposite sides of said lug, and a pin carried on said housing arranged to project between said lug and first one, and then the other of said springs as the piston reciprocates, the free end portions of said springs being deflected toward said lug.

CASWELL C. MATLOCK.
BERNARD BALDWIN.